G. W. KNAPP.
HANDLE FOR COVERS OF VESSELS.
APPLICATION FILED JAN. 24, 1910.
1,005,557.
Patented Oct. 10, 1911.
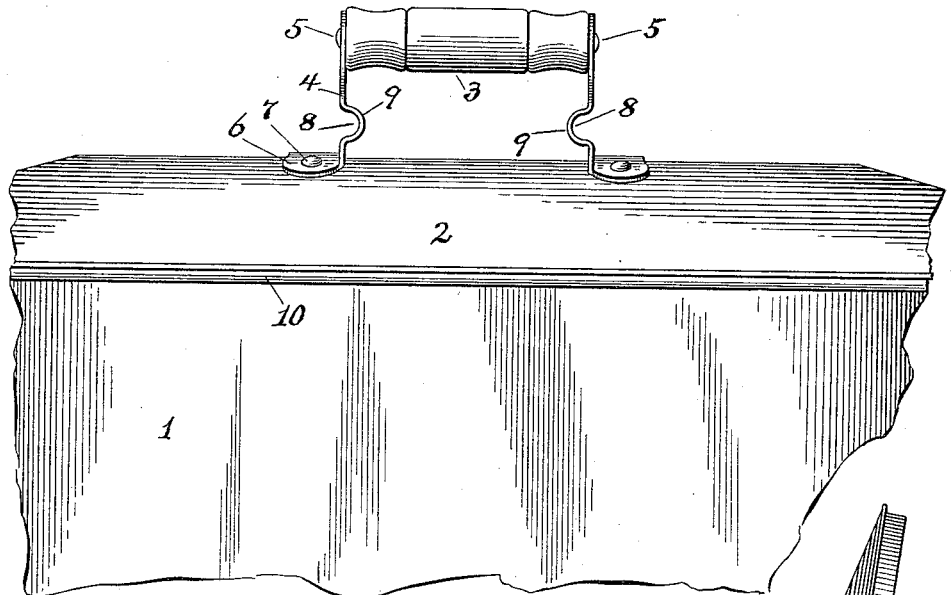
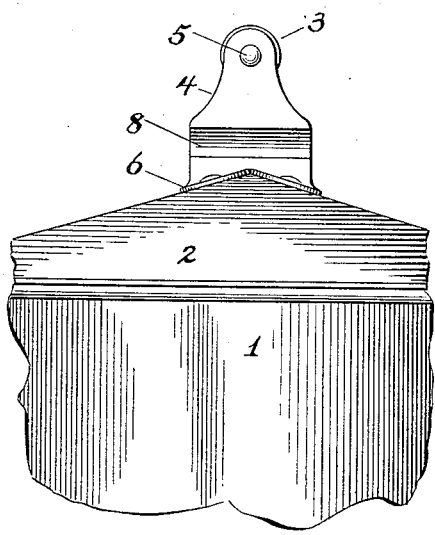
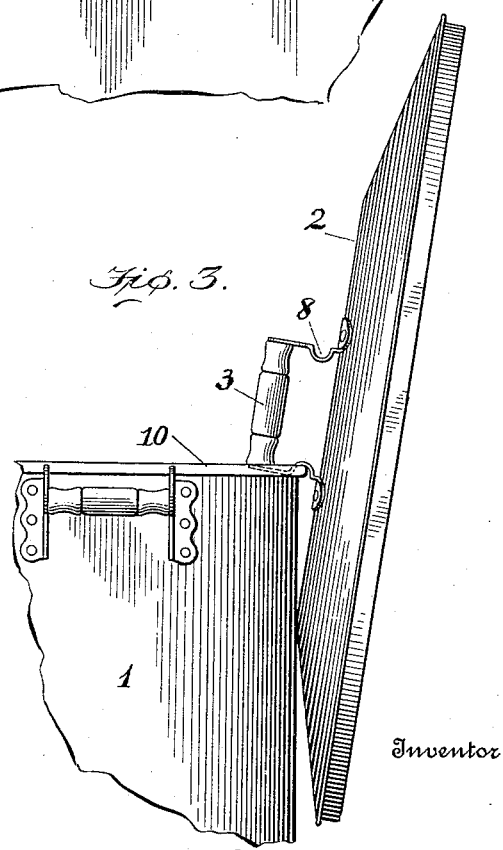
Witnesses
Edwin L. Bradford
G. Ferdinand Vogt
Inventor
George W. Knapp
By Mann & Co.
Attorneys

UNITED STATES PATENT OFFICE.

GEORGE W. KNAPP, OF BALTIMORE, MARYLAND, ASSIGNOR TO NATIONAL ENAMELING AND STAMPING COMPANY, OF BALTIMORE, MARYLAND, A CORPORATION OF NEW JERSEY.

HANDLE FOR COVERS OF VESSELS.

1,005,557. Specification of Letters Patent. Patented Oct. 10, 1911.

Application filed January 24, 1910. Serial No. 539,807.

*To all whom it may concern:*

Be it known that I, GEORGE W. KNAPP, a citizen of the United States, residing at Baltimore, in the State of Maryland, have invented certain new and useful Improvements in Handles for Covers of Vessels, of which the following is a specification.

This invention relates to an improved handle for covers of sheet-metal vessels such for instance as wash-boilers, ham-boilers and the like. The handle-grasp part of these handles is preferably made of wood. In such vessels it is often necessary to temporarily remove the cover while the vessel and cover are hot in order to give some attention to the contents, and when the hot cover has thus been temporarily removed it is desirable to support the cover by hanging it at one side of the vessel. When thus supporting the cover it is also further desirable that the hand-grasp part of the handle shall have its longitudinal axis nearly upright, or in a crosswise position with respect to the top-rim of the vessel, in order that the said hand-grasp part may be readily taken hold of.

The invention therefore consists of a cover-handle having a hand-grasp part whose longitudinal axis is long enough to be grasped by the several fingers of the hand, and two metal standards or legs at least one of which is provided with means for engaging with the top-rim of the vessel when the cover has been removed, so as to support the cover while the hand-grasp part has its longitudinal axis in an upright position, in order that said hand-grasp part will be freely accessible to a person's hand.

The invention is shown in the annexed drawing.

Figure 1 is a side view of a vessel, its cover, and one form of the improved handle. Fig. 2 shows the outer side of the standard of the handle seen in Fig. 1. Fig. 3 is a broken end view of the vessel, and shows the improved handle supporting the cover while the hand-grasp part of said handle is in an upright position.

The vessel or boiler is designated by the numeral, 1, and the cover used to close the said vessel or boiler, 2. The hand-grasp part, 3, of the handle may be made of wood and at each end is a metal standard or leg, 4, which is attached to the said hand-grasp by suitable means. In the present instance the attaching means consists of a metal pin, 5, extending longitudinally through the hand-grasp and having its ends riveted to said standards, 4. Each standard or leg, 4, has a lateral foot, 6, that contacts with the top surface of the cover, 2, and one or more rivets, 7, are employed to fasten the standard-foot to the cover, 2.

Referring now to Figs. 1, 2 and 3 the standards, or at least one of them, is provided at its outer side with a depressed hook, bend or groove, 8, which extends horizontally cross-wise of said standard. By the "outer side" is meant the side that is outward or away from the end of the hand-grasp part, 3. The crosswise hook-depression or groove, 8, forms on the opposite or inner side of the standard a convex bend, 9. Where both standards, 4, of the same handle are provided with the said crosswise hook, depression or groove, 8, the convex bends of the two standards project toward each other, as seen in Fig. 1. The said hook, depression or groove, 8, on the standard of the handle serves the useful purpose of engaging with the top-rim, 10, of a vessel and thereby supporting the cover. By reference to Fig. 3, it will be seen that when this handle is supporting the cover, the hand-grasp, 3, has its longitudinal axis in an upright position and extends crosswise with respect to the top-rim, 10, of the vessel. In this position the said hand-grasp part is accessible to a person's hand without liability of the hot vessel burning the hand. When the cover, 2, of the vessel is removed and it is desired to support the cover while giving some attention to the contents of vessel, it is only necessary to turn the cover in a nearly vertical position so that the longitudinal axis of the hand-grasp part, 3, of the handle will be at right-angles with the top-rim, 10, of the vessel as seen in Fig. 3, and engage the crosswise groove, 8, at the lower end of the handle with said top-rim, 10, and the cover will then be supported.

Having thus described my invention what I claim and desire to secure by Letters Patent is,—

1. The combination of a vessel having a top-rim; a cover for said vessel; and a handle secured to the cover—said handle comprising a hand-grasp part, 3, having attached at each end a leg provided with a crosswise groove depressed on the outer side of the leg—each depressed groove forming a convex bend, 9, on the inner side of the leg—the said two convex bends projecting toward each other, whereby the cover may be supported on the top-rim by the said groove of either leg while the hand-grasp part of the handle has its axis upright and in direction cross-wise of the said top-rim.

2. The combination of a vessel having a top-rim; a cover for said vessel; and a handle comprising a hand-grasp part having a leg which is attached to the cover and said leg provided with a groove which extends crosswise and in a direction transverse of the axis of the said hand-grasp part and adapted to engage with the said top-rim of the vessel when the cover has been removed, and thereby support the cover.

In testimony whereof I affix my signature in presence of two witnesses.

GEORGE W. KNAPP.

Witnesses:
G. FERDINAND VOGT,
LOUIS C. KLERLEIN.

Copies of this patent may be obtained for five cents each, by addressing the "Commissioner of Patents, Washington, D. C."